United States Patent [19]

Nagase et al.

[11] 4,419,974
[45] Dec. 13, 1983

[54] METHOD OF AND APPARATUS FOR CONTROLLING THE IGNITION TIMING OF AN INTERNAL COMBUSTION ENGINE

[75] Inventors: Masaomi Nagase; Hironobu Ono, both of Toyota; Jiro Nakano; Hideo Miyagi, both of Okazaki, all of Japan

[73] Assignee: Toyota Jidosha Kogyo Kabushiki Kaisha, Toyota, Japan

[21] Appl. No.: 304,558

[22] Filed: Sep. 22, 1981

[30] Foreign Application Priority Data

Sep. 27, 1980 [JP] Japan ............................ 55-133680

[51] Int. Cl.$^3$ .......................................... F02P 5/04
[52] U.S. Cl. .................................. 123/418; 123/421
[58] Field of Search ............... 123/416, 417, 421, 424, 123/418

[56] References Cited

U.S. PATENT DOCUMENTS

| | | | |
|---|---|---|---|
| 3,543,738 | 12/1970 | Barber | 123/421 X |
| 3,901,201 | 8/1975 | Mizuguchi et al. | |
| 4,022,170 | 5/1977 | Crall et al. | 123/421 X |
| 4,077,372 | 3/1978 | Masta | |
| 4,104,998 | 8/1978 | Fenn | |
| 4,112,891 | 9/1978 | Spaulding | 123/421 X |
| 4,131,098 | 12/1978 | Daniels et al. | |
| 4,178,893 | 12/1979 | Aoki | |
| 4,232,642 | 11/1980 | Yamaguchi et al. | |
| 4,262,644 | 4/1981 | Walker et al. | 123/416 X |
| 4,276,602 | 6/1981 | Obara et al. | 123/417 X |
| 4,359,988 | 2/1980 | Matsubara | |

Primary Examiner—Tony M. Argenbright
Attorney, Agent, or Firm—Cushman, Darby & Cushman

[57] ABSTRACT

A spark advance angle is calculated depending upon the flow rate of air sucked into the engine or the pneumatic pressure in the intake manifold and upon the rotational speed of the engine. The calculated spark advance angle is corrected in response to the temperature of the air sucked into the engine.

16 Claims, 16 Drawing Figures

METHOD OF AND APPARATUS FOR CONTROLLING THE IGNITION TIMING OF AN INTERNAL COMBUSTION ENGINE

BACKGROUND OF THE INVENTION

The present invention relates to a method of controlling the ignition timing of an internal combustion engine.

A well-known method of controlling the ignition timing of the engine consists in detecting the flow rate of the intake air or the pneumatic pressure in the intake manifold and the rotational speed as operating condition parameters, calculating an optimum ignition timing from the detected operating condition parameters by using a predetermined function which represents the relationship between optimum ignition timings and the operating condition parameters, and practically adjusting the ignition timing responsive to the calculated value. The optimum ignition timing should be set so that the best torque can be obtained without development of knocking under any operating condition. In general, however, the lower timing advance value of the knocking zone changes with the intake air temperature. Therefore, it is very difficult to select the optimum ignition timing at which best torque of the engine can be obtained without developing and knocking. Namely, when the intake air temperature is low, the lower timing advance value of the knocking zone changes toward a more to advanced ignition timing. When the intake air temperature is high, on the other hand, the lower timing advance value changes toward a more delayed ignition timing. Therefore, if the ignition timing is selected to be advanced as much as possible so that best engine torque is obtained without developing knocking at a low intake air temperature, a rise in the intake air temperature then causes knocking which deteriorates the operation feeling and produces harmful gases. On the other hand, if the ignition timing is selected to be advanced as much as possible so that best engine torque is obtained without developing knocking at a high intake air temperature, an excessive margin is provided against the development of knocking, decreasing engine torque is decreased and increasing fuel consumption, when the intake air temperature is low.

The above problem occurs in an engine in which the ignition timing for producing the best torque (hereinafter this timing is referred to as MBT) lies in the knocking zone, and thus knocking develops at an ignition timing which lags behind MBT when the ignition timing is advanced. In other engines or even in the same engine, however, the MBT may appear on the side lagging behind the knocking zone under light to medium load conditions. With this type of engine or under this load condition, the spark advance angle for generating the MBT will shift toward the delay direction when the intake air temperature is low, and shift toward the advance direction when the intake air temperature is high. Therefore, if the ignition timing is selected so that a best engine torque is obtained at low intake air temperature, the ignition timing considerably lags behind the MBT causing the obtained engine torque to be lowered and fuel consumption to be greatly increased when the intake air temperature is high.

SUMMARY OF THE INVENTION

It is, therefore, an object of the present invention to provide a method of and apparatus for controlling the ignition timing of an internal combustion engine, whereby knocking can be reliably prevented from occurring and the best engine torque can be produced, without deteriorating the operation performance, the operation feeling or fuel consumption.

According to the present invention, the flow rate of air sucked into the engine or the pneumatic pressure in an intake manifold is detected to produce a first electrical signal which indicates the detected flow rate of air or the detected pneumatic pressure. Also the rotational speed of the engine is detected to produce a second electrical signal which indicates the detected rotational speed. In response to the first and second electrical signals, a spark advance angle is calculated which represents an optimum ignition timing at the operating condition corresponding to the detected flow rate of air or the detected pneumatic pressure and to the detected rotational speed. The temperature of air sucked into the engine is detected to produce a third electrical signal which indicates the detected intake air temperature, and in response to the third electrical signal, the calculated spark advance angle is corrected. The timing of the sparks applied to the engine is controlled depending upon the spark advance angle.

The above and other related objects and features of the present invention will be apparent from the description of the present invention set forth below, with reference to the accompanying drawings, as well as from the appended claims.

DETAILED DESCRIPTION OF THE PREFERRED EMBODIMENTS

Figure 1:
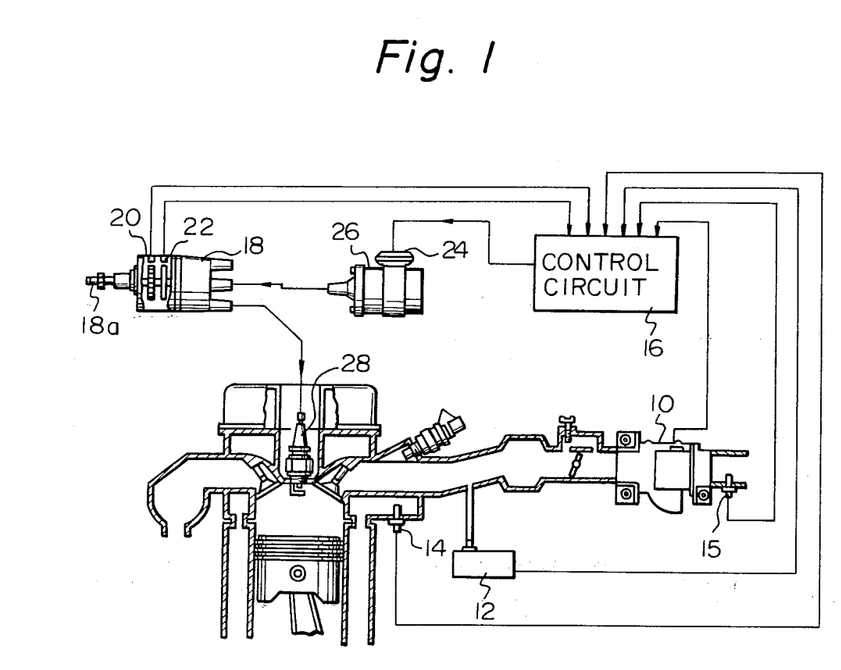
FIG. 1 is a schematic diagram illustrating a system in which the method of the present invention is used.

Referring to FIG. 1, in which an example of an ignition timing control system of an internal combustion engine, having a microcomputer, according to the present invention is illustrated, a reference numeral 10 denotes an air flow sensor. The air flow sensor 10 detects the flow rate of the air sucked into the engine and generates a voltage that corresponds to a detected flow rate. A pneumatic pressure sensor 12 detects the pneumatic pressure in an intake manifold of the engine and generates a voltage corresponding to a detected pressure. A coolant temperature sensor 14 detects the temperature of the coolant of the engine and produces a voltage corresponding to a detected temperature. An intake air temperature sensor 15 detects the temperature of the intake air of the engine and produces a voltage corresponding to a detected temperature. A control circuit 16 is served with output voltages from the air flow sensor 10, the pneumatic pressure sensor 12, the coolant temperature sensor 14, and the intake air temperature sensor 15.

A distributor 18 of the engine is equipped with a first crank angle sensor 20 and a second crank angle sensor 22 which generate angular position signals every time the distributor shaft 18a rotates by predetermined angles, for example, 30° and 360° in terms of crank angles, respectively. The two angular position signals from the crank angle sensors 20 and 22 are fed to the control circuit 16.

The control circuit 16 feeds an ignition signal to an igniter 24 which permits and interrupts the flow of a primary current to an ignition coil 26. A secondary current of a high voltage produced by the ignition coil 26 is fed to spark plugs 28 via the distributor 18.

Figure 2:
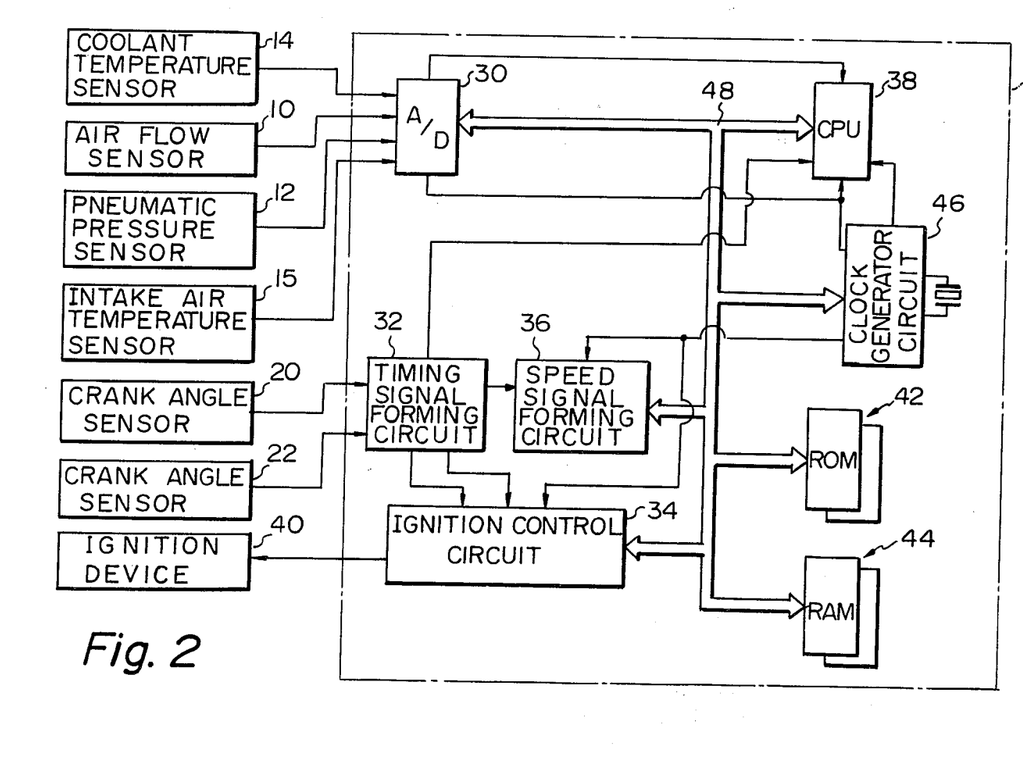
FIG. 2 is a block diagram illustrating a control circuit in the system of FIG. 1.

FIG. 2 is a block diagram illustrating an example of the control circuit 16 of FIG. 1.

Output voltages of the coolant temperature sensor 14, air flow sensor 10, pneumatic pressure sensor 12 and intake air temperature sensor 15 are fed to an A/D converter 30 having functions of an analog multiplexer and a converter, and are converted into binary signals in sequence at a predetermined conversion interval.

The angular position signal produced by the first crank angle sensor 20 at every crank angle of 30° and the second crank angle sensor 22 at every crank angle of 360°, are fed to a timing signal-forming circuit 32 which is a well known circuit. The timing signal-forming circuit 32 forms various timing signals for an ignition control circuit 34, an interrupt request signal for calculating the ignition timing, and a gate control signal which is used in a speed signal-forming circuit 36. The timing signal-forming circuit 32 may be constructed by combining flip-flop circuits and logical operation elements.

As is widely known, the speed signal-forming circuit 36 has a gate that will be opened and closed by the gate control signal having a pulse width which corresponds to the crank angle of 60° fed from the timing signal-forming circuit 32, and a counter which counts the number of clock pulses that pass through the gate when the gate is opened each time. Thus, the speed signsl-forming circuit 36 forms a binary speed signal having a value that corresponds to the rotational speed of the engine.

The ignition control circuit 34 is equipped with two registers, two down counters and a flip-flop. One of the two registers receives output data related to the timing of starting to flow a current on the ignition coil 26, which output data is calculated by a central processing unit (CPU) 38. The other register receives output data related to the timing of finishing of the flow of current, i.e., related to the ignition timing. The two down counters generate pulses at moments determined by the output data. The flip-flop is set and reset by the pulses from the down counters and generates an ignition signal which represents a period for carrying the electric current to the ignition coil. The ignition control circuit of this type has also been widely known. The ignition signal is fed to the ignition device 40 of FIG. 1, which device consists of spark plugs 28, the distributor 18 and the ignition coil 26.

The A/D converter 30, speed signal-forming circuit 36, and ignition control circuit 34 are connected to the CPU 38, read-only memory (ROM) 42, random access memory (RAM) 44 and clock generator circuit 46 via a bus 48. The input and output data are transferred via the bus 48.

Although not diagrammatized in FIG. 2, the microcomputer is further equipped with an input/output control circuit, memory control circuit and the like in a customary manner.

In the ROM 42 have been stored beforehand a program for the main processing routine, an interrupt processing program for calculating the ignition timing and other processing programs, as well as various data necessary for performing the calculation, as will be mentioned later.

In FIGS. 1 and 2, the engine is equipped with both the air flow sensor 10 and the pneumatic pressure sensor 12. The present invention, however, can be put into practice if either one of these sensors 10 and 12 is provided.

Below is illustrated the operation processed by the aforementioned microcomputer. The following description deals with the case when the air flow sensor 10 is used instead of the pneumatic pressure sensor 12.

Figure 3:
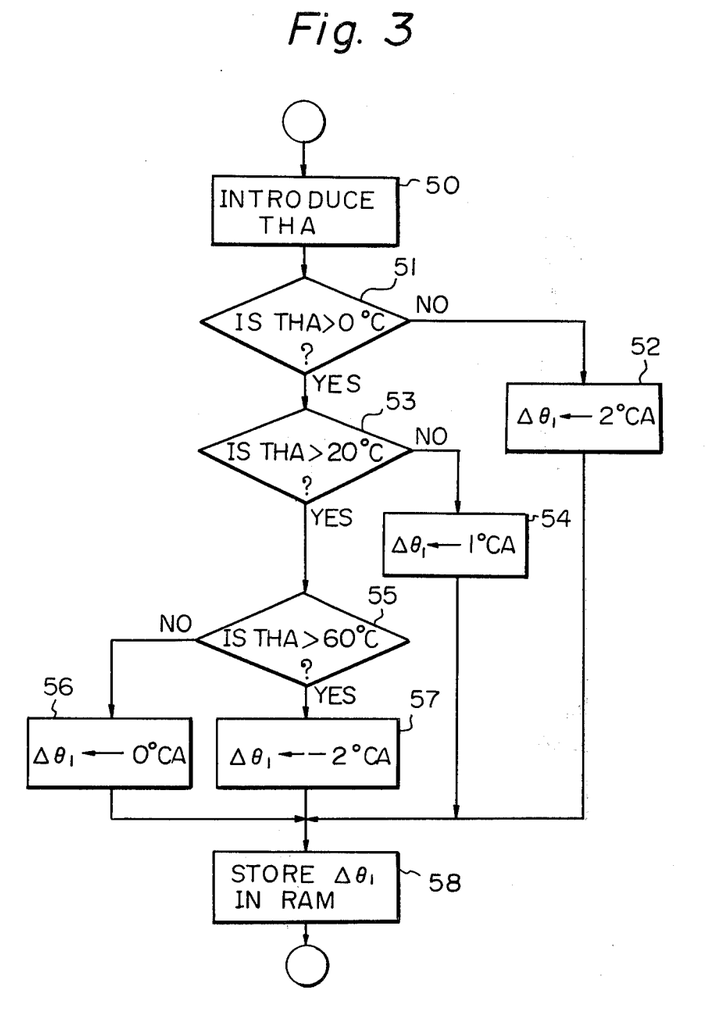
FIGS. 3 and 4 are flow diagrams illustrating one operation of the microcomputer in the control circuit of FIG. 2.
Figure 5:
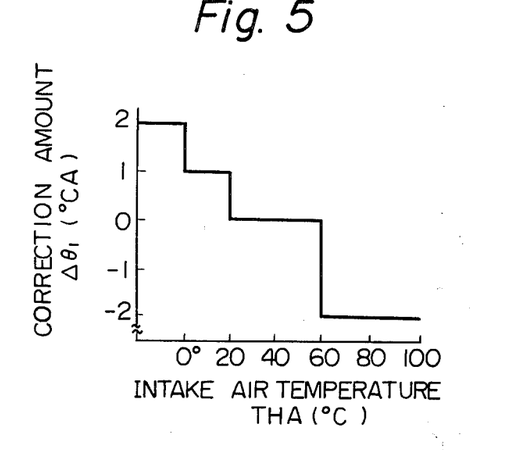
FIG. 5 is a graph illustrating the relation of the correction amount $\Delta\theta_1$ calculated by the processing routine of FIG. 3, with respect to the intake air temperature THA.

In the main processing routine, the CPU 38 executes the processing which is shown in FIG. 3. First, at a point 50 the CPU 38 introduces a detected data related to the intake air temperature THA that is subjected to the A/D conversion by the A/D converter 30 and that is stored in a predetermined region of the RAM 44. Then, at a point 51, the CPU 38 discriminates whether the intake air temperature THA is higher than 0° C. or not. When the temperature THA is lower than or equal to 0° C., the program proceeds to a point 52 where a correction amount $\Delta\theta_1$ of a spark advance angle $\theta$ is determined to be 2° CA (2° of the crank angle). When the intake air temperature THA is higher than 0° C., the program proceeds to a point 53 where it is discriminated whether the intake air temperature THA is higher than 20° C. or not. When it is discriminated at the point 53 that the intake air temperature THA is lower than or equal to 20° C., the program proceeds to a point 54 where $\Delta\theta_1$ is determined to be 1° CA. When the intake air temperature THA is higher than 20° C., the program proceeds to a point 55 where it is discriminated whether the intake air temperature THA is higher than 60° C. or not. When it is discriminated at the point 55 that the THA is lower than or equal to 60° C., the program proceeds to a point 56 where $\Delta\theta_1$ is determined to be 0° CA. When it is discriminated that the THA is higher than 60° C., the program proceeds to a point 57 where $\Delta\theta_1$ is determined to be $-2°$ CA. At a point 58, then, the correction amount $\Delta\theta_1$ determined depending upon the intake air temperature THA is stored in a predetermined region in the RAM 44. Through the processes of points 51 to 57 as mentioned above, the correction amount $\Delta\theta_1$ of the spark advance angle $\theta$ is set to be 2° CA when THA<0° C., set to be 1° CA when 0° C.<THA$\leq$20° C., set to be 0° CA when 20° C.<THA$\leq$60° C., and set to be $-2°$ CA when 60°<THA. FIG. 5 illustrates THA versus $\Delta\theta_1$ characteristics obtained by the processing routine of FIG. 3.

Figure 4:
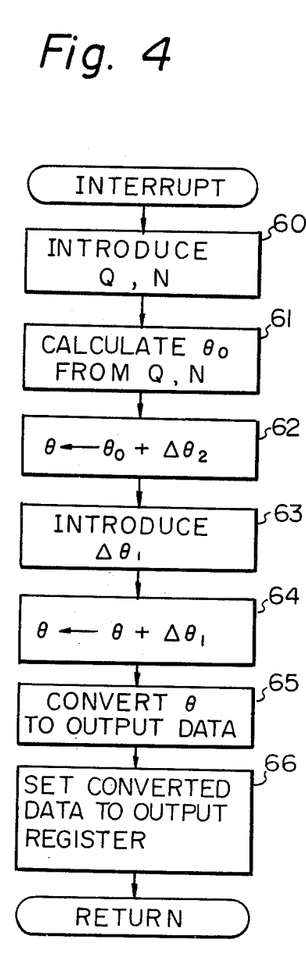
Figure 6:
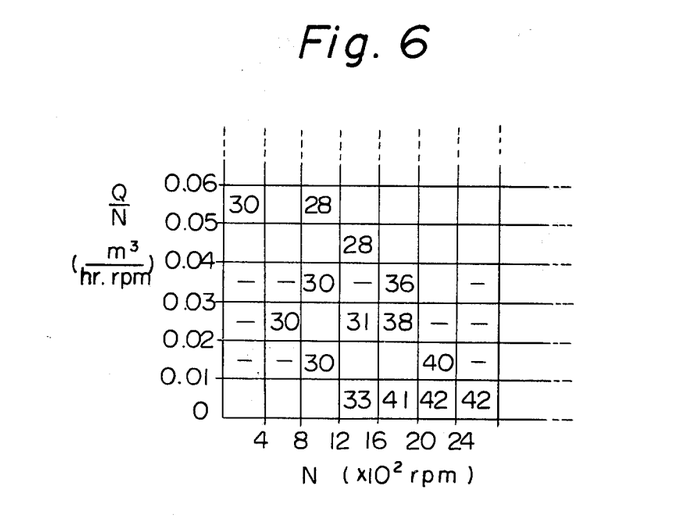
FIG. 6 is a map diagram illustrating the relation of the spark advance angle $\theta$ relative to the load Q/N and to the rotational speed N.

On the other hand, the CPU 38 executes the processing routine illustrated in FIG. 4 to calculate the ignition timing responsive to an interrupt request signal that is generated by the timing signal-forming circuit 32 at every predetermined crank angle, for example, responsive to an interrupt request signal that is generated at every 120° CA in the case when the engine is of the type of four-cycle six-cylinder. First, at a point 60, the CPU 38 receives detected data related to the flow rate Q of the intake air, which has been converted to a signal in the form of a binary number by the A/D converter 30 and that has been stored in a predetermined region of the RAM 44, and further receives detected data related to the rotational speed N of the engine that has been produced by the speed signal forming circuit 36 and that has been stored in a predetermined region of the RAM 44. Then, at a point 61, the CPU 38 performes calculation to find a spark advance angle $\theta_0$ from the detected data related to Q and N. The spark advance angle $\theta_0$ can be calculated by a variety of methods which have been widely known. For instance, the spark advance angle $\theta_0$ can be calculated from a map which indicates a predetermined function of a relation of the spark advance angle $\theta_0$ relative to the rotational speed N and the load Q/N, as shown in FIG. 6. The CPU 38, then, at a point 62, corrects the calculated spark advance angle $\theta_0$ depending upon the warm-up condition. Namely, at the point 62, the calculation $\theta \rightarrow \theta_0 + \Delta\theta_2$ based upon the warm-up correction amount $\Delta\theta_2$ which is determined depending upon the coolant temperature THW is performed. Then, at a point 63 the CPU 38 introduces the correction amount $\Delta\theta_1$ which was calculated depending upon the intake air temperature THA by the main processing routine of FIG. 3 and has been stored in the RAM 44. At a point 64, then, the CPU 38 corrects the spark advance angle $\theta$ based upon the correction amount $\Delta\theta_1$. Namely, at the point 64, the operation $\theta \rightarrow \theta + \Delta\theta_1$ is performed. Then, at a point 65, the CPU 38 calculates a crank angle between an ignition timing angle corresponding to the finally calculated spark advance angle $\theta$ and a reference angular position, further calculates the time required by the crank shaft to turn the calculated crank angle, and then converts the calculated value into a count number of the down counter in the ignition control circuit 34. The converted ignition timing data is set, at a next point 66, to the register in the ignition control circuit 34. Thus, the interrupt processing routine of FIG. 4 is completed. The CPU 38 calculates the data related to the moment for initiating the current to the ignition coil to flow by a customary manner, based upon the above-calculated ignition timing data, and sends the calculated data to another register in the ignition control circuit 34.

Since the ignition timing is controlled by the thus calculated ignition timing data, knocking can be reliably prevented from occurring without lowering the engine torque and without increasing fuel consumption.

Figure 7:
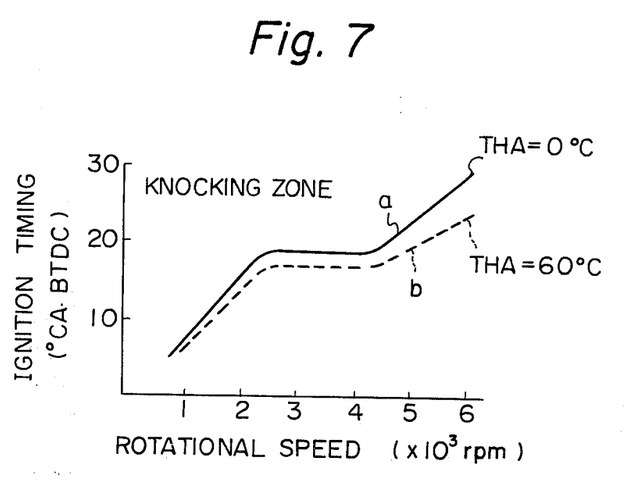
FIG. 7 is a graph illustrating the knocking zone.
Figure 8:
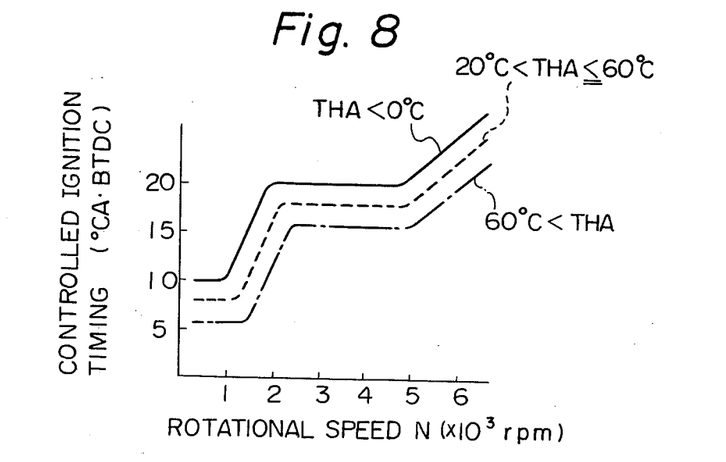
FIG. 8 is a graph illustrating the ignition timing controlled by the processing routine of FIG. 4, with respect to the rotational speed N.

As aforementioned, threshold values of the knocking zone related to ignition timing and revolving speed vary depending upon the intake air temperature. FIG. 7 illustrates the above-mentioned variation, in which a solid line a represents threshold values when the intake air temperature is 0° C., and a broken line b illustrates threshold values when the intake air temperature is 60° C. In FIG. 7, the knocking zone is indicated as the region above the solid line a or the broken line b. According to the processing routines shown in FIGS. 3 and 4, therefore, the ignition timing is controlled in response to the intake air temperature as shown in FIG. 8. In other words, the ignition timing can be advanced as much as possible within a range which does not develop knocking for each of the intake air temperatures. Consequently, knocking can be prevented without lowering the engine torque and without increasing fuel consumption.

Figure 9:
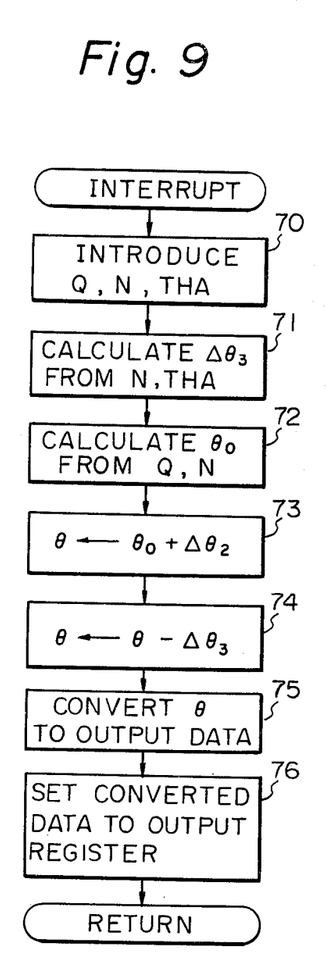
FIG. 9 is a flow diagram illustrating another operation of the microcomputer in the control circuit of FIG. 2.

FIG. 9 illustrates a processing routine by the microcomputer according to another embodiment of the present invention. In this embodiment, the CPU 38 calculates the correction amount $\Delta\theta_3$ and corrects the spark advance angle $\theta$ by the calculated correction amount $\Delta\theta_3$, in a single interrupt processing routine. According to the same interrupt request as that of the processing routine of FIG. 4, the CPU 38 at a point 70 introduces detected data which are related to the flow rate Q of intake air, rotational speed N and intake air temperature THA. Then, at a point 71, the CPU 38 calculates the correction amount $\Delta\theta_3$ based upon the rotational speed N and the intake air temperature THA, in accordance with the following equation, $$\Delta\theta_3 = (4.7 \times 10^{-5} N + 0.018) \times (THA - 50)$$

Then, at points 72 and 73, the CPU 38 performs the same processings as those of points 61 and 62 of FIG. 4, to obtain the spark advance angle $\theta$. Then, at a point 74, the CPU 38 corrects the spark advance angle $\theta$ by using the correction amount $\Delta\theta_3$ that is calculated at the point 71. Namely, at the point 74, the calculation $\theta \rightarrow \theta - \Delta\theta_3$ is performed. Thereafter, at points 75 and 76, quite the same processings as those of the points 65 and 66 of FIG. 4 are performed, and the interrupt processing is finished.

Figure 10:
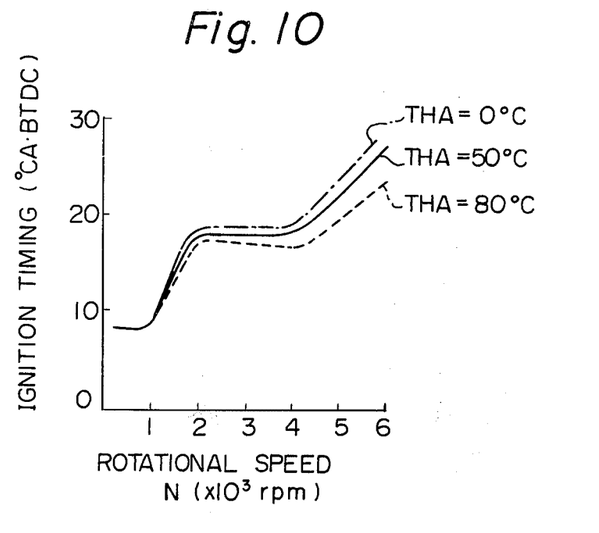
FIG. 10 is a graph illustrating the ignition timing controlled by the processing routine of FIG. 9, with respect to the rotational speed N.

FIG. 10 illustrates characteristics of the ignition timing controlled by the processing routine of FIG. 9 relative to the rotational speed N and the intake air temperature THA.

With regard to the internal combustion engines, in general, a threshold value of the knocking zone related to an ignition timing when the intake air temperature is THA, relative to a threshold value when the intake air temperature is 50° C., is changed by, $$\Delta SA = (4.7 \times 10^{-5} N + 0.018) \times (THA - 50)$$

Therefore, it is possible to perform an optimum ignition timing control which prevents the occurrence of knocking while maximizing the engine torque and minimizing fuel consumption, by correcting the spark advance angle $\theta_0$ calculated by the point 71 which angle $\theta_0$ is an optimum spark advance angle when the intake air temperature is 50° C., based upon the correction amount $\Delta\theta_3$ that is equal to $\Delta SA$, in accordance with the processing routine of FIG. 9.

Figure 11:
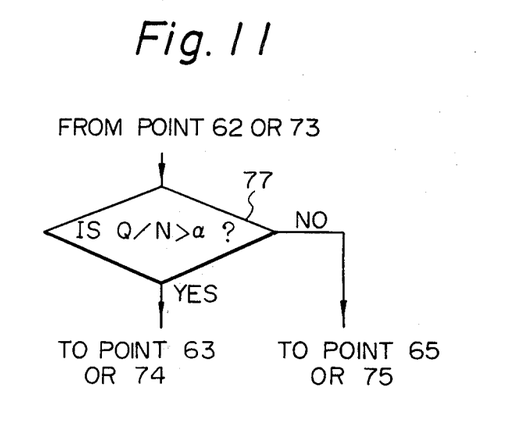
FIG. 11 is a flow diagram illustrating a part of further operation of the microcomputer in the control circuit of FIG. 2.

The embodiment based upon the processing routines of FIGS. 3 and 4, and the embodiment based upon the processing routine of FIG. 9, may be carried out throughout the whole load regions of the engine. Depending upon the type of the engine, however, the above-mentioned embodiments should be put into practice only in the heavy load regions. That is to say, with the engines which develop knocking at ignition timings that lag behind the MBT only under heavy load conditions, it is recommended to employ the latter method. In this case, the processing of the point 77 of FIG. 11 is executed following the point 62 of FIG. 4 or following the point 73 of FIG. 9. Namely, at the point 77, the CPU 38 discriminates whether the load Q/N is greater than a predetermined value $\alpha$ or not. When $Q/N > \alpha$, the engine is regarded to be in heavy load condition, and the program proceeds to the next point 63 of FIG. 4 or to the point 74 of FIG. 9. When $Q/N \leq \alpha$, the program proceeds to the point 65 of FIG. 4 or to the point 75 of FIG. 9, without correcting the ignition timing depending upon the intake air temperature.

Figure 12:
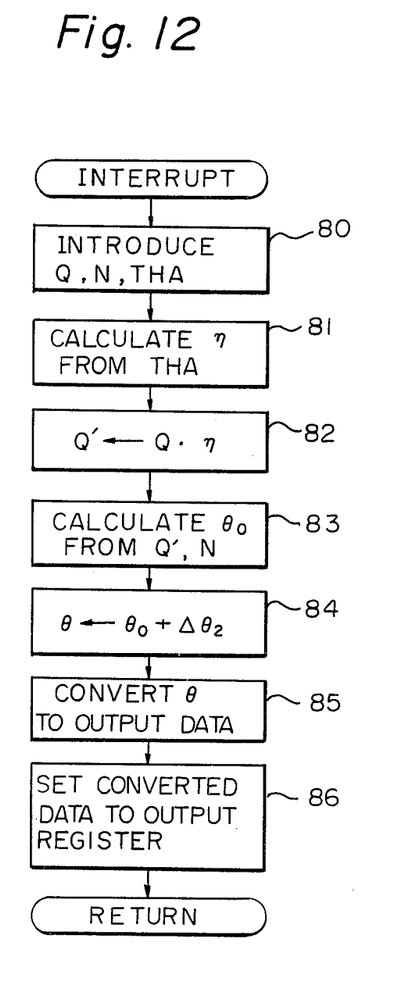
FIG. 12 is a flow diagram illustrating a still further operation of the microcomputer in the control circuit of FIG. 2.
Figure 13:
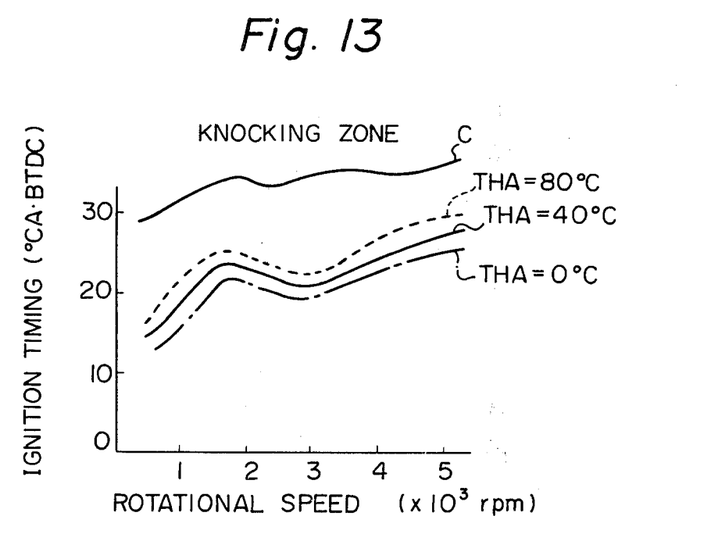
FIG. 13 is a graph illustrating the MBT and knocking zone.
Figure 14:
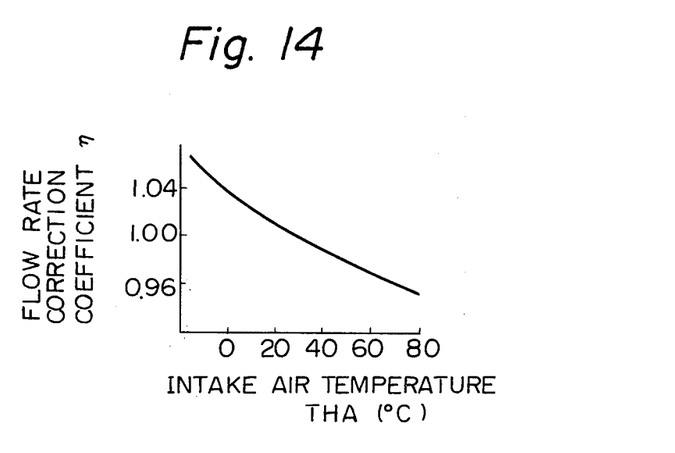
FIG. 14 is a graph illustrating the relation of the flow rate correction coefficient $\eta$ with respect to the intake air temperature THA.
Figure 15:
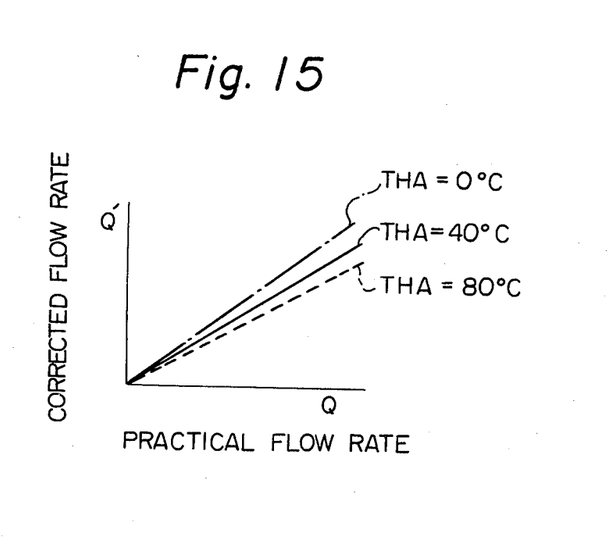
FIG. 15 is a graph illustrating the relation of the corrected flow rate Q' of the intake air with respect to the practical flow rate Q of the intake air.

FIG. 12 illustrates a processing routine by the microcomputer for controlling the ignition timing responsive to the intake air temperature according to a further embodiment of the present invention. The method of controlling ignition timing responsive to the intake air temperature of this embodiment, however, is applied to the engines in which the MBT appears on the side that lags behind the knocking zone. The object of this embodiment therefore is to set the ignition timing to the MBT that varies depending upon the intake air temperature rather than to prevent the occurrence of knocking. Namely, as the efficiency for charging the intake air decreases with the increase in the temperature of the intake air, the ignition timing at which a best engine torque develops, generally, changes toward the advance side as shown in FIG. 13. Therefore, the ignition timing should be shifted to the advance direction when the intake air temperature is raised to obtain the MBT. In FIG. 13, symbol C denotes a lower limit of the knocking zone. In the embodiment of FIG. 12, also, the CPU 38 corrects the ignition timing responsive to the intake air temperature in the interrupt processing routine. According to the same interrupt request as that of the processing routine of FIG. 4, the CPU 38, first, introduces at a point 80 the detected data related to the flow rate Q of intake air flow, rotational speed N and intake air temperature THA. Then, at a point 81, the CPU 38 calculates a flow rate correction coefficient $\eta$ from a function that represents the relation between the intake air temperature THA and the flow rate correction coefficient $\eta$ as shown in FIG. 14. Then, at a point 82, the CPU 38 multiplies the flow rate Q of intake air detected at the point 80 by the coefficient $\eta$ in order to obtain a corrected flow rate Q' of the intake air. FIG. 15 shows the corrected flow rate Q' of the intake air relative to the practically detected flow rate Q of the intake air with the intake air temperatures THA as parameters. When the intake air temperature THA is 40° C., $Q' = Q$. When the intake air temperature THA becomes higher than 40° C., the corrected flow rate Q' of the intake air used for calculating the ignition timing becomes smaller than the practical flow rate Q of the intake air. When the intake air temperature THA becomes smaller than 40° C., on the other hand, the corrected flow rate Q' of the intake air becomes greater than the practical flow rate Q of the intake air.

Then, by using the flow rate Q' corrected responsive to the intake air temperature THA, the spark advance angle $\theta_0$ is calculated at a point 83 from the same mapping Q'/N to N as that of FIG. 6, and the processing is then carried out through points 84, 85 and 86 that are equivalent to the points 62, 65 and 66 in the processing routine of FIG. 4, respectively. According to this embodiment as mentioned above, since the detected flow rate of the intake air is corrected responsive to the intake air temperature as mentioned above, even when the intake air temperature is changed, the ignition timing can be brought into agreement with the MBT which is shown in FIG. 13.

Figure 16:
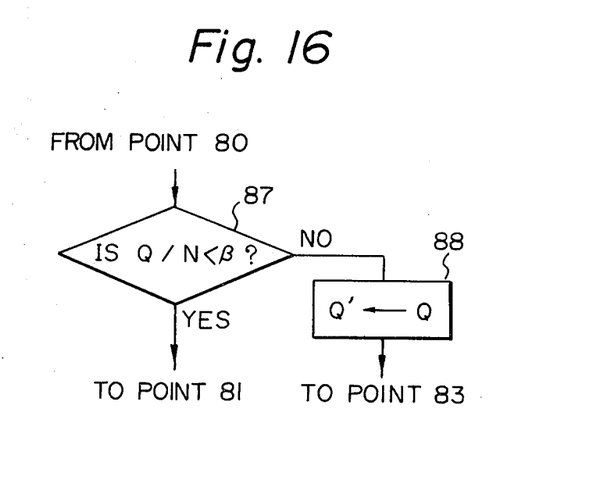
FIG. 16 is a flow diagram illustrating a part of the further operation of the microcomputer in the control circuit of FIG. 2.

The emgodiment relying upon the processing routine of FIG. 12 may be put into practice throughout the whole load regions of the engine. Depending upon the type of the engine, however, the above-mentioned embodiment should be put into practice only in the light to medium load regions. That is, with the engine in which the knocking zone lies on the side in advance of the MBT only under the light to medium load conditions, it is desired to control the ignition timing only when the engine is in the light to medium load conditions. In this case, the processing of point 87 of FIG. 16 is carried out subsequent to the point 80 of FIG. 12. Namely, at the point 87, the CPU 38 discriminates whether the load Q/N is greater than a predetermined value $\beta$ or not. When $Q/N < \beta$, the engine is regarded to be under medium to light load conditions. The program therefore proceeds to the point 81 of FIG. 12. When $Q/N \geq \beta$, the flow rate Q is not corrected responsive to the intake air temperature. Namely at a point 88 the operation $Q' \rightarrow Q$ is performed, and the program proceeds to the point 83.

Although the aforementioned embodiments employ the flow rate Q of the intake air and the rotational speed N as operating condition parameters, it is of course allowable to use the pneumatic pressure in the intake manifold and the rotational speed as the operating condition parameters. It is because, the pneumatic pressure in the intake manifold can be regarded to be nearly equal to the load Q/N.

According to the present invention as explained in detail in the foregoing, the ignition timing calculated depending upon the operating condition parameters is shifted toward the advance direction when there develops the problem of knocking, i.e., when the detected intake air temperature is lower than a predetermined value under heavy load conditions. When the detected intake air temperature is higher than the predetermined value, on the other hand, the calculated ignition timing is shifted to the delay direction. When the intake air temperature is low, therefore, the operation performance such as engine torque and the like can be enhanced, the operation feeling can be improved, and the fuel consumption can be reduced. When the intake air temperature is high, the development of knocking can be restrained, and the emission of harmful components can be reduced. Further, when the development of knocking is not much of a problem, the ignition timing is shifted toward the delay direction in the case when the intake air temperature is low with the engine being under light to medium load conditions, to obtain a best engine torque. When the intake air temperature is high, on the other hand, the ignition timing is shifted toward the advance direction to obtain a best engine torque.

Thus, the output can be increased and the fuel consumption can be improved, as well.

According to the present invention as mentioned above, knocking can be reliably prevented without sacrificing operation performance, operation feeling or fuel consumption.

Further, even when the intake air temperature is changed, the ignition timing is controlled so that a best engine torque is obtained at all times.

As many widely different embodiments of the present invention may be constructed without departing from the spirit and scope of the present invention, it should be understood that the present invention is not limited to the specific embodiments described in this specification, except as defined in the appended claims.

We claim:

1. A method of controlling the ignition timing of an internal combustion engine having an intake manifold, said method comprising the steps of:

detecting one of the flow rate of air sucked into the engine and the pneumatic pressure in the intake manifold, and producing a first electrical signal related thereto;

detecting the rotational speed of the engine and producing a second electrical signal related thereto;

calculating, in response to said first and second electrical signals, a spark advance angle which represents an optimum ignition timing at the operating condition corresponding to the detected flow rate of air or the detected pneumatic pressure and to the detected rotational speed;

detecting the temperature of air sucked into the engine to produce a third electrical signal which indicates the detected intake air temperature;

correcting, in response to said second and third electrical signals, said calculated spark advance angle, said correcting step including the steps of increasing said calculated spark advance angle by a variable value when the detected intake air temperature is lower than a predetermined temperature, and decreasing said calculated spark advance angle by a variable value when the detected intake air temperature is higher than the predetermined temperature, said variable value changing depending upon the difference between the detected intake air temperature and the predetermined temperature and upon the detected rotational speed indicated by the second electrical signal; and controlling the timing of the sparks applied to the engine depending upon said spark advance angle.

2. A method as claimed in claim 1, wherein said variable value changes stepwise.

3. A method as claimed in claim 1, wherein said variable value changes continuously.

4. A method as claimed in claim 1, wherein said method further comprises steps of:

detecting the load condition of the engine to produce a fourth electrical signal which indicates the detected load condition; and discriminating, in response to the fourth electrical signal, whether the detected load condition is heavier than a predetermined load condition or not, to perform said correcting step only when the detected load condition is heavier than the predetermined load condition.

5. A method of controlling the ignition timing of an internal combustion engine, said method comprising the steps of:

detecting the flow rate of air sucked into the engine and producing a first electrical signal which indicates the detected flow rate of air;

detecting the rotational speed of the engine and producing a second electrical signal which indicates the detected rotational speed;

detecting the temperature of air sucked into the engine and producing a third electrical signal which indicates the detected intake air temperature;

correcting, in response to said third electrical signal, said detected flow rate of air and producing a fifth electrical signal which indicates the corrected flow rate of air;

detecting the load condition of the engine and producing a fourth electrical signal which indicates the detected load condition;

discriminating, in response to the fourth electrical signal, whether the detected load condition is lighter than a predetermined load condition or not, to perform said correcting step only when the detected load condition is lighter than the predetermined load condition;

calculating, in response to said fifth and second electrical signals, a spark advance angle which represents an optimum ignition timing at the operating condition corresponding to the corrected flow rate of air and to the detected rotational speed; and controlling the timing of the sparks applied to the engine depending upon said spark advance angle.

6. A method as claimed in claim 5, wherein said correcting step includes a step of correcting, in response to said third electrical signal, said detected flow rate of air to increase when the detected intake air temperature is lower than a predetermined temperature, and to decrease when the detected intake air temperature is higher than the predetermined temperature.

7. Apparatus for controlling the ignition timing of an internal combustion engine having an intake manifold, said apparatus comprising:

means for detecting one of the flow rate of air sucked into the engine and the pneumatic pressure in the intake manifold and producing a first electrical signal related thereto;

means for detecting the rotational speed of the engine and producing a second electrical signal related to the detected rotational speed;

means for detecting the temperature of air sucked into the engine and producing a third electrical signal related to the detected intake air temperature;

processing means for (1) determining, in response to said first and second electrical signals, a spark advance angle which represents an optimum ignition timing at the operating condition corresponding to said first and second electrical signals, (2) increasing said spark advance angle by a variable value when the detected intake air temperature is lower than a predetermined temperature, and (3) decreasing said spark advance angle by a variable value when the detected intake air temperature is higher than the predetermined temperature, said variable value changing depending upon the difference between the detected intake air temperature and the predetermined temperature and upon the detected rotational speed indicated by the second electrical signal; and means for controlling the timing of the sparks applied to the engine depending upon said spark advance angle.

8. Apparatus as in claim 7, wherein said processing means changes said variable value in a stepwise manner.

9. Apparatus as in claim 7, wherein said processing means changes said variable value in a continuous manner.

10. Apparatus as in claim 7, wherein:
said apparatus further comprises means for detecting the load condition of the engine and producing a fourth electrical signal which indicates the detected load condition; and
said processing means is also for discriminating, in response to the fourth electrical signal, whether the detected load condition is heavier than a predetermined load condition or not, to perform said correcting function only when the detected load condition is heavier than the predetermined load condition.

11. Apparatus for controlling the ignition timing of an internal combustion engine, said apparatus comprising:
means for detecting the flow rate of air sucked into the engine and producing a first electrical signal which indicates the detected flow rate of air;
means for detecting the rotational speed of the engine and producing a second electrical signal which indicates the detected rotational speed;
means for detecting the temperature of air sucked into the engine and producing a third electrical signal which indicates the detected intake air temperature;
means for detecting the load condition of the engine to produce a fourth electrical signal which indicates the detected load condition;
processing means for (1) correcting, in response to said third electrical signal, said detected flow rate of air, to produce a fifth electrical signal which indicates the corrected flow rate of air, (2) discriminating, in response to the fourth electrical signal, whether the detected load condition is lighter than a predetermined load condition or not, to perform said correcting step only when the detected load condition is lighter than the predetermined load condition, and (3) calculating, in response to said fifth and second electrical signals, a spark advance angle which represents an optimum ignition timing at the operating condition corresponding to the corrected flow rate of air and to the detected rotational speed; and
means for controlling the timing of the sparks applied to the engine depending upon said spark advance angle.

12. Apparatus as in claim 11, wherein said processing means is for increasing said detected flow rate of air when the detected intake air temperature is lower than a predetermined temperature, and for decreasing said detected flow rate of air when the detected intake air temperature is higher than the predetermined temperature.

13. A method of controlling the ignition timing of an internal combustion engine having an intake manifold, said method comprising the steps of:
detecting one of the flow rate of air sucked into the engine and the pneumatic pressure in the intake manifold, and producing a first electrical signal related thereto;
detecting the rotational speed of the engine and producing a second electrical signal related thereto;
calculating, in response to said first and second electrical signals, a spark advance angle which represents an optimum ignition timing at the operating condition corresponding to the detected flow rate of air or the detected pneumatic pressure and to the detected rotational speed;
detecting the temperature of air sucked into the engine to produce a third electrical signal which indicates the detected intake air temperature;
correcting, in response to said second and third electrical signals, said calculated spark advance angle, said correcting step including the steps of increasing said calculated spark advance angle by a variable value when the detected intake air temperature is higher than a predetermined temperature, and decreasing said calculated spark advance angle by a variable value when the detected intake air temperature is lower than the predetermined temperature, said variable value changing depending upon the difference between the detected intake air temperature and the predetermined temperature and upon the detected rotational speed indicated by the second electrical signal; and
controlling the timing of the sparks applied to the engine depending upon said spark advance angle.

14. A method as claimed in claim 13, wherein said method further comprises steps of:
detecting the load condition of the engine and producing a fourth electrical signal which indicates the detected load condition; and
discriminating, in response to the fourth electrical signal, whether the detected load condition is lighter than a predetermined load condition or not, to perform said correcting step only when the detected load condition is lighter than the predetermined load condition.

15. Apparatus for controlling the ignition timing of an internal combustion engine having an intake manifold, said apparatus comprising:
means for detecting one of the flow rate of air sucked into the engine and the pneumatic pressure in in the intake manifold and producing a first electrical signal related thereto;
means for detecting the rotational speed of the engine and producing a second electrical signal related to the detected rotational speed;
means for detecting the temperature of air sucked into the engine and producing a third electrical signal related to the detected intake air temperature;
processing means for (1) determining, in response to said first and second electrical signals, a spark advance angle which represents an optimum ignition timing at the operating condition corresponding to said first and second electrical signals, (2) increasing said spark advance angle by a variable value when the detected intake air temperature is higher than a predetermined temperature, and (3) decreasing said spark advance angle by a variable value when the detected intake air temperature is lower than the predetermined temperature, said variable value changing depending upon the difference between the detected intake air temperature and the predetermined temperature and upon the detected rotational speed indicated by the second electrical signal; and means for controlling the timing of the sparks applied to the engine depending upon said spark advance angle.

16. Apparatus as in claim 15, wherein:

said apparatus further comprises means for detecting the load condition of the engine to produce a fourth electrical signal which indicates the detected load condition; and said processing means is for discriminating, in response to the fourth electrical signal, whether the detected load condition is lighter than a predetermined load condition or not, to perform said correcting step only when the detected load condition is lighter than the predetermined load condition.

* * * * *